US008712152B2

(12) United States Patent
Jeong et al.

(10) Patent No.: US 8,712,152 B2
(45) Date of Patent: Apr. 29, 2014

(54) METHOD OF PROCESSING DATA AND DISPLAY APPARATUS FOR PERFORMING THE METHOD

(75) Inventors: Jae-Won Jeong, Seoul (KR); Duc-Han Cho, Incheon (KR); Woo-Jin Jung, Seoul (KR); Woo-Young Lee, Daegu (KR); Kang-Hyun Kim, Seoul (KR); Su-Bin Park, Incheon (KR)

(73) Assignee: Samsung Display Co., Ltd. (KR)

( * ) Notice: Subject to any disclaimer, the term of this patent is extended or adjusted under 35 U.S.C. 154(b) by 128 days.

(21) Appl. No.: 13/438,080

(22) Filed: Apr. 3, 2012

(65) Prior Publication Data

US 2012/0257827 A1 Oct. 11, 2012

(30) Foreign Application Priority Data

Apr. 8, 2011 (KR) ........................ 10-2011-0032693

(51) Int. Cl.
*G06K 9/00* (2006.01)

(52) U.S. Cl.
USPC ........................................................ 382/167

(58) Field of Classification Search
USPC ................ 345/581, 589–591, 611, 690, 694; 348/252, 625, 630, 655, 674–675; 358/1.9, 448, 516, 518–521; 382/162, 382/167, 254, 260, 266, 270, 274–275
See application file for complete search history.

(56) References Cited

U.S. PATENT DOCUMENTS

| | | | | |
|---|---|---|---|---|
| 6,292,157 | B1 * | 9/2001 | Greene et al. | 345/1.3 |
| 7,375,854 | B2 * | 5/2008 | Hsu et al. | 358/1.9 |
| 7,659,945 | B2 * | 2/2010 | Kim et al. | 348/675 |
| 7,969,456 | B2 * | 6/2011 | Brown Elliott et al. | 345/694 |
| 8,456,483 | B2 * | 6/2013 | Han | 345/581 |

* cited by examiner

*Primary Examiner* — Jose Couso
(74) *Attorney, Agent, or Firm* — Cantor Colburn LLP

(57) ABSTRACT

A method of processing data includes correcting received color data and generating corrected color data, generating color glitch correction data corresponding to the corrected color data using a glitch correction value preset based on the received color data, and converting the color glitch correction data into a color data voltage and providing the color data voltage to a display panel.

20 Claims, 6 Drawing Sheets

FIG. 3

| GRAY | POSITION OF GLITCH | Wx | Wy | COLOR OF GRAYSCALE |
|---|---|---|---|---|
| 32 | R G↓B↑R | 0.2705 | 0.2860 | REDDISH |
| 33 | R G↓B↑R | 0.2713 | 0.2876 | REDDISH |
| 34 | R G↑B↓R | 0.2695 | 0.2859 | REDDISH |
| 35 | R G↑B↓R | 0.2696 | 0.2868 | REDDISH |
| 36 | R G↓B↑R | 0.2710 | 0.2874 | REDDISH |
| 37 | R G↓B↑R | 0.2719 | 0.2892 | REDDISH |
| 38 | R G↑B↓R | 0.2696 | 0.2871 | REDDISH |
| 39 | R G↑B↓R | 0.2696 | 0.2875 | REDDISH |
| 40 | R G↓B↑R | 0.2718 | 0.2882 | REDDISH |
| 41 | R G↓B↑R | 0.2726 | 0.2906 | REDDISH |

METHOD OF PROCESSING DATA AND DISPLAY APPARATUS FOR PERFORMING THE METHOD

This application claims priority to Korean Patent Application No. 2011-0032693, filed on Apr. 8, 2011, and all the benefits accruing under 35 U.S.C. §119, the contents of which are herein incorporated by reference in their entireties.

BACKGROUND OF THE INVENTION

1. Field of the Invention

Exemplary embodiments of the invention relate to a method of processing data, and a display apparatus for performing the method. More particularly, exemplary embodiments of the invention relate to a method of processing data for improving a display quality, and a display apparatus for performing the method.

2. Description of the Related Art

Generally, a liquid crystal display ("LCD") apparatus includes an LCD panel displaying an image using a transmission of a liquid crystal ("LC"), a data driving circuit and a gate driving circuit driving the LCD panel.

Generally, the LCD panel includes a red pixel (R), a green pixel (G), a blue pixel (B), and a plurality of data lines connected to the data driving circuit and providing a data voltage of an analogue type to color pixels. Generally, a pixel structure is a stripe type that includes one data line connected to one color pixel. Recently, in order to decrease the number of the data driving circuit, a new pixel structure decreasing the number of the data lines has been developed. For example, the new pixel structure includes a sharing pixel structure having one data line connected to color pixels being different form each other and being adjacent to each other, and a horizontal pixel structure having one data line connected to red, green and blue color pixels arranged in a direction extended parallel the data line, etc.

As described above, when one data line is connected to color pixels being different from each other, the data driving circuit sequentially outputs color data voltages different from each other to the data line.

FIG. 1 is a waveform diagram illustrating a data voltage and a gate signal applied to R, G and B pixels.

Referring to FIG. 1, R, G and B data voltages DATA different from each other are applied to one data line connected to R, G and B color pixels. In a period in which the R data voltage is changed into a G data voltage, a high glitch HG increasing the data voltage occurs. In addition, in a period in which the G data voltage is changed into a B data voltage, a low glitch LG decreasing the data voltage occurs.

In order to pre-charge the pixels, gate signals are respectively applied to each of the R, G and G pixels before a time in which each of the R, G and G data voltages is applied to each of the R, G and G pixels. The gate signal Gg is applied to the G pixel before a timing t1 in which the G data voltage is applied to the G pixel so that a data voltage higher than the G data voltage by the high glitch HG is charged in the G pixel. However, a data voltage lower than the B data voltage by the low glitch LG is charged in the B pixel. In other words, the gate signal Gb is applied to the B pixel before a timing t2 in which the B data voltage is applied to the B pixel so that the data voltage lower than the B data voltage by the low glitch LG is charged in the B pixel.

As described above, according to a transition of the data voltage, data voltages different from original data voltages are charged in the R, G and B color pixels so that non-uniform color is displayed.

BRIEF SUMMARY OF THE INVENTION

Exemplary embodiments of the invention provide a method of processing data for improving uniformity of a color.

Exemplary embodiments of the invention also provide a display apparatus for performing the method of processing the data.

According to an exemplary embodiment of the invention, there is provided a method of processing data. In the method, received color data is corrected and corrected color data is generated. Color glitch correction data is generated corresponding to the corrected color data using a glitch correction value preset based on the received color data. The color glitch correction data is converted into a color data voltage and the color data voltage is provided to a display panel.

In an exemplary embodiment, the color data voltage may include a red data voltage, a green data voltage and a blue data voltage, and the red, green and blue data voltages may be applied to a same data line in the display panel.

In an exemplary embodiment, the generating the color glitch correction data may include determining whether the received color data is an achromatic color or a chromatic color, and generating achromatic color glitch correction data corresponding to achromatic corrected color data using the glitch correction value, when the received color data is the achromatic color.

In an exemplary embodiment, the converting the color glitch correction data may include converting the achromatic corrected color data into the color data voltage and providing the color data voltage to the data line, when the received color data is the chromatic color.

In an exemplary embodiment, the generating the color glitch correction data may include determining whether the received color data is an achromatic color or a chromatic color, generating achromatic color glitch correction data corresponding to achromatic corrected color data using the glitch correction value for an achromatic color, when the received color data is the achromatic color, and generating chromatic color glitch correction data corresponding to chromatic corrected color data using the glitch correction value for a chromatic color, when the received color data is the chromatic color.

According to another exemplary embodiment of the invention, there is provided a method of processing data. In the method, red, green and blue corrected data are generated to be uniform a white level corresponding to received red, green and blue data. The red, green and blue corrected data is corrected using a glitch correction value preset based on the received red, green and blue data, and red, green and blue glitch correction data is generated. The red, green and blue glitch correction data is converted into red, green and blue data voltages and the red, green and blue data voltages are output to a data line of a display panel by a time-division mode, where the red, green and blue glitch correction data corrects a glitch generated by transition of the red, green and blue data voltages applied to the data line.

In an exemplary embodiment, when the received red, green and blue data are the same, the red, green and blue glitch correction data may be generated using the glitch correction value for an achromatic color.

In an exemplary embodiment, when at least one of the received red, green and blue data are different from each other, the red, green and blue corrected data may be converted into the red, green and blue data voltages and the red, green and blue data voltages may be output to the data line by the time-division mode.

In an exemplary embodiment, when at least one of the received red, green and blue data are different from each other, the red, green and blue glitch correction data are generated using the glitch correction value for a chromatic color.

In an exemplary embodiment, the method may further include generating an enable signal for the glitch correction, wherein the red, green and blue glitch correction data are generated based on the enable signal for the glitch correction.

In an exemplary embodiment, the method may further include generating an enable signal for a white correction, wherein the red, green and blue glitch correction data are generated using the glitch correction value for the achromatic color in response to the enable signal for the white correction.

In an exemplary embodiment, the method may further include generating an enable signal for a color correction, where the red, green and blue glitch correction data are generated using the glitch correction value for the chromatic color in response to the enable signal for the color correction According to another exemplary embodiment of the invention, a display apparatus includes a display panel, a color correcting part, a glitch correcting part and a data driving part. The display panel includes a plurality of color pixels. The color correcting part generates corrected color data corresponding to received color data using a look-up table ("LUT") storing the corrected color data. The glitch correcting part generates color glitch correction data corresponding to the corrected color data using a glitch correction value preset based on the received color data. The data driving part converts the corrected color data and the color glitch correction data into a color data voltage and providing the color data voltage to the display panel.

In an exemplary embodiment, the display panel may include a plurality of data lines and a plurality of gate lines, and each of the data lines may be connected to color pixels which are different from each other.

In an exemplary embodiment, each of the data lines may be in connection with red, green and blue pixels.

In an exemplary embodiment, the color data voltage may include red, green and blue data voltages, and the data driving part may provide the red, green and blue data voltages to a same data line.

In an exemplary embodiment, the display apparatus may further include a control part which controls an operation of the glitch correcting part.

In an exemplary embodiment, the glitch correcting part may determine whether the received color data is an achromatic color or a chromatic color. When the received color data is the achromatic color, the control part controls the glitch correcting part to apply the glitch correction value to achromatic corrected color data generated from the color correcting part and generates achromatic color glitch correction data.

In an exemplary embodiment, when the received color data is the chromatic color, the control part may control the glitch correcting part to provide chromatic corrected color data generated from the color correcting part to the data driving part.

In an exemplary embodiment, the glitch correcting part may determine whether the received color data is an achromatic color or a chromatic color. When the received color data is the achromatic color, the glitch correcting part applies the glitch correction value for an achromatic color to achromatic corrected color data and generates achromatic color glitch correction data, and when the received color data is the chromatic color, the glitch correcting part applies the glitch correction value for a chromatic color to chromatic corrected color data and generates chromatic color glitch correction data.

According to the invention, the color data is corrected using the glitch correction value preset corresponding to a transition of the data voltage so that a falling off in a display quality by non-uniform color, etc. may be reduced or effectively prevented.

BRIEF DESCRIPTION OF THE DRAWINGS

The above and other features of the invention will become more apparent by describing in detailed exemplary embodiments thereof with reference to the accompanying drawings, in which:

FIG. 3 is a table illustrating data measurements of a color tendency of gray-scales corresponding to white data corrected from a color correcting part of FIG. 2;

DETAILED DESCRIPTION OF THE INVENTION

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. As used herein, the term "and/or" includes any and all combinations of one or more of the associated listed items.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be explained in detail with reference to the accompanying drawings.

Figure 1:
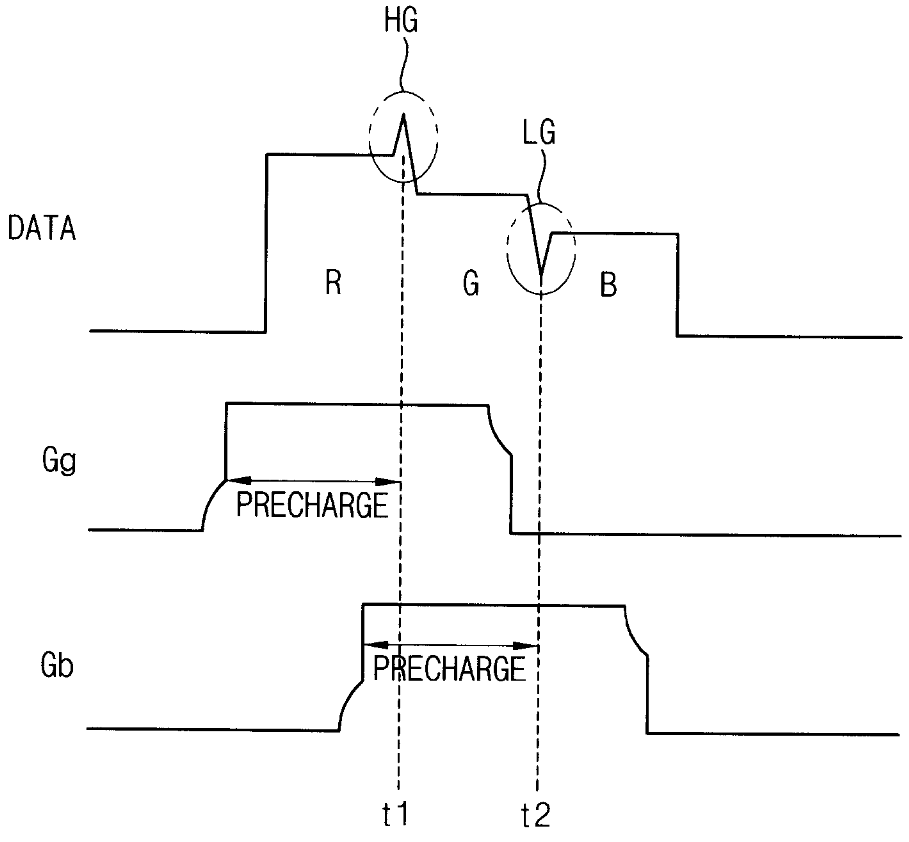
FIG. 1 is a waveform diagram illustrating a data voltage and a gate signal applied to red, green and blue pixels.
Figure 2:
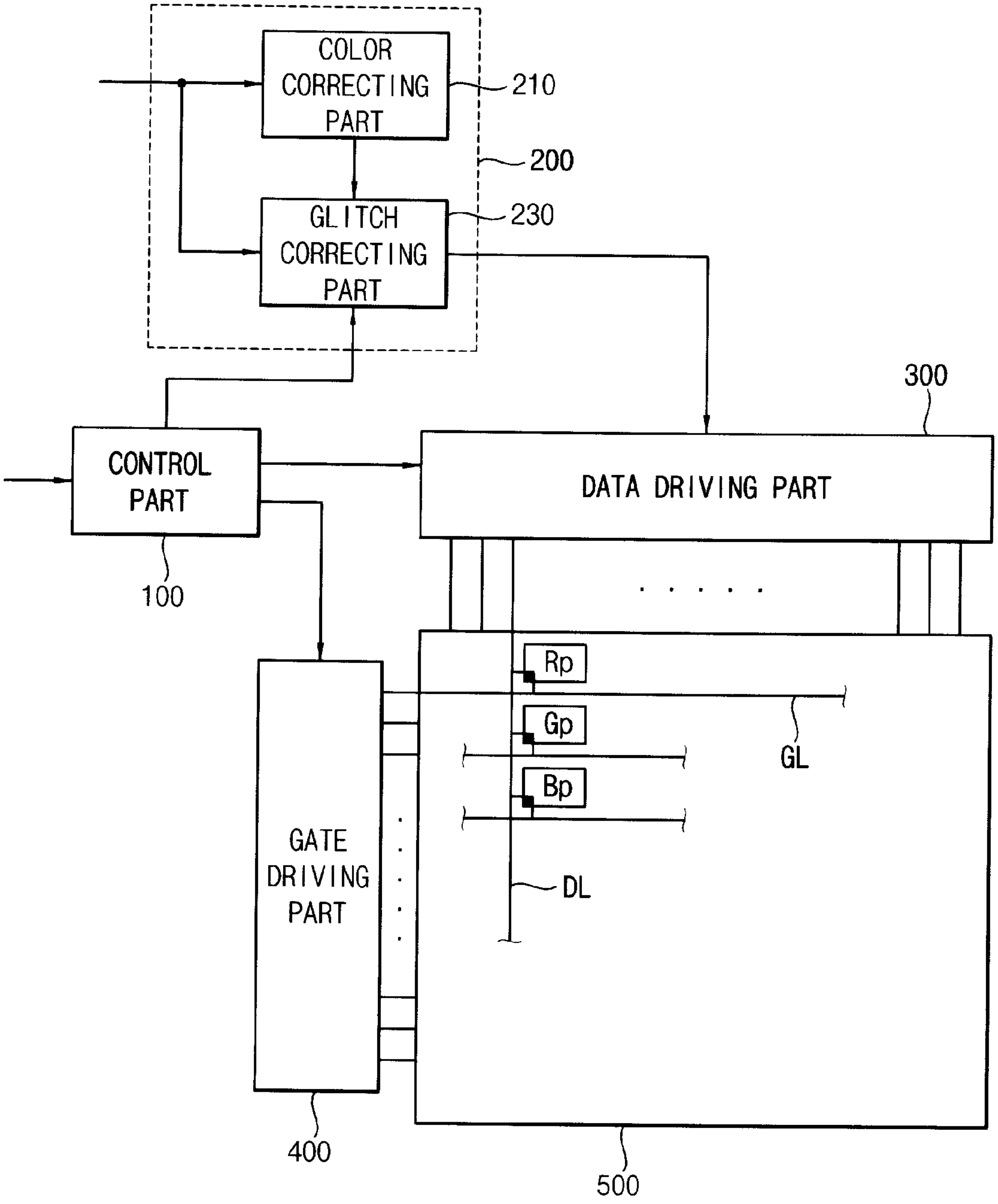
FIG. 2 is a block diagram illustrating an exemplary embodiment of a display apparatus according to the invention.

FIG. 2 is a block diagram illustrating an exemplary embodiment of a display apparatus according to the invention.

Referring to FIG. 2, the display apparatus includes a control part 100, a data processing part 200, a data driving part 300, a gate driving part 400 and a display panel 500.

The control part 100 generates a data control signal and a gate control signal to control a driving timing of the data driving part 300 and the gate driving part 400 based on a synchronization signal received from an external device. The control part 100 may control an operation of the data processing part 200.

The data processing part 200 includes a color correcting part 210 and a glitch correcting part 230.

The color correcting part 210 generates corrected color data corresponding to received color data. The corrected color data is used to uniformly correct a white level (white color coordinate) of the received color data. In one exemplary embodiment, for example, the color correcting part 210 generates corrected red, green and blue data corresponding to the received red, green and blue data. The color correcting part 210 may include a look-up table ("LUT") storing a reference color data sampled among color data of grayscales, and a calculating part calculating the corrected color data corresponding to color data of grayscales not stored in the LUT using an interpolation method.

The glitch correcting part 230 corrects the corrected color data generated from the color correcting part 210 using a glitch correction value provided from the control part 100 to generate color glitch correction data. The glitch correction value is preset for correcting a glitch which is occurred at timing in which a color data voltage applied to the data line is changed into a different color voltage. In one exemplary embodiment, for example, when the received red, green and blue data is the same grayscale value as an achromatic color data (for example, a white data), the glitch correcting part 230 generates red, green and blue glitch correction data to remove the glitch using the red, green and blue glitch correction values.

The data driving part 300 converts the corrected color data and the color glitch correction data of a digital type into a color data voltage of an analogue type and provides the color data voltage to the display panel 500, based on the data control signal provided from the control part 100.

The gate driving part 400 generates a gate signal and provides the gate signal to the display panel 500, based on the gate control signal provided from the control part 100.

The display panel 500 includes a plurality of data lines DL, a plurality of gate lines GL crossing the data lines DL and a plurality of color pixels Rp, Gp and Bp. Each of the data lines DL is connected to at least two color pixels different from each other. As illustrated in FIG. 2, for example, a red color pixel Rp, a green color pixel Gp and a blue color pixel Bp may be connected to a same one data line. The data driving part 300 provides red, green and blue data voltages to the data line DL with a time-division mode.

FIG. 3 is a table illustrating data measurements of a color tendency of grayscales corresponding to white data corrected from a color correcting part of FIG. 2.

Referring to FIGS. 2 and 3, characteristics of the glitch according to grayscales of white data as the achromatic color corrected by the color correcting part 210 are measured.

The color correcting part 210 corrects received white data into corrected white data. The data driving part 300 converts the corrected white data into a white data voltage and provides the white data voltage to the display panel 500.

Referring to FIG. 3, for example, the received data that is the received white data of 32-grayscale, is converted into corrected white data voltage of the 32-grayscale by the color correcting part 210 and the data driving part 300 so that the corrected white data voltage of the 32-grayscale is applied to the data line. The corrected white data includes corrected red, green and blue data having the same grayscale value. Thus, the corrected white data voltage of the 32-grayscale includes red, green and blue data voltages R, G and B of the 32-grayscale. The corrected white data voltage of the 32-grayscale includes a low glitch (↓) between green and blue data voltages G and B, and a high glitch (↑) between blue and red data voltages B and R. Thus, the corrected white data of the 32 grayscale displays a reddish white.

Corrected white data voltage of 33-grayscale includes the low glitch (↓) between green and blue data voltages G and B, and the high glitch (↑) between blue and red data voltages B and R. The corrected white data voltage of the 33-grayscale includes red, green and blue data voltages of the 33-grayscale. Thus, the corrected white data of the 33-grayscale displays the reddish white.

Corrected white data voltage of 34-grayscale includes the high glitch (↑) between green and blue data voltages G and B, and the low glitch (↓) between blue and red data voltages B and R. The corrected white data voltage of the 34-grayscale includes red, green and blue data voltages of the 34-grayscale. Thus, the corrected white data of the 34-grayscale displays a bluish white.

Corrected white data voltage of 35-grayscale includes the high glitch (↑) between green and blue data voltages G and B, and the low glitch (↓) between blue and red data voltages B and R. The corrected white data voltage of the 35-grayscale includes red, green and blue data voltages of the 35-grayscale. Thus, the corrected white data of the 35-grayscale displays the bluish white.

As described above, a white image may be non-uniformly displayed by the glitch included in the corrected white data voltage corresponding to the corrected white data.

In exemplary embodiment, a glitch correction value of the grayscale is preset based on the glitch included in the corrected white data voltage of the grayscale. The glitch correcting part 230 corrects the corrected white data generated from the color correcting part 210 using the glitch correction value so that the white image may be displayed uniformly.

Referring to FIG. 3, the corrected white data of the grayscale alternatively displays the reddish white and the bluish white about every 2 grayscales. Thus, color tendency of the grayscales are estimated and the glitch correction value is set thereby. The glitch correction value includes a first glitch correction value for correcting the reddish white and a second glitch correction value for correcting the bluish white. The first and second glitch correction values may be alternatively applied to the corrected white data of the grayscale every two grayscales. In one exemplary embodiment, for example, the first glitch correction value is applied to the corrected white data of the 32-grayscale and the 33-grayscale displaying the reddish white so that the reddish white may be corrected into a normal white. The second glitch correction value is applied to the corrected white data of the 34-grayscale and the 35-grayscale displaying the bluish white so that the bluish white may be corrected into the normal white.

The glitch correction value may include a red glitch correction value, a green glitch correction value and a blue glitch correction value. In one exemplary embodiment, for example, each of the red, green and blue glitch correction values may have a range of −7 to +7, that is, values of 4 bits.

Figure 4:
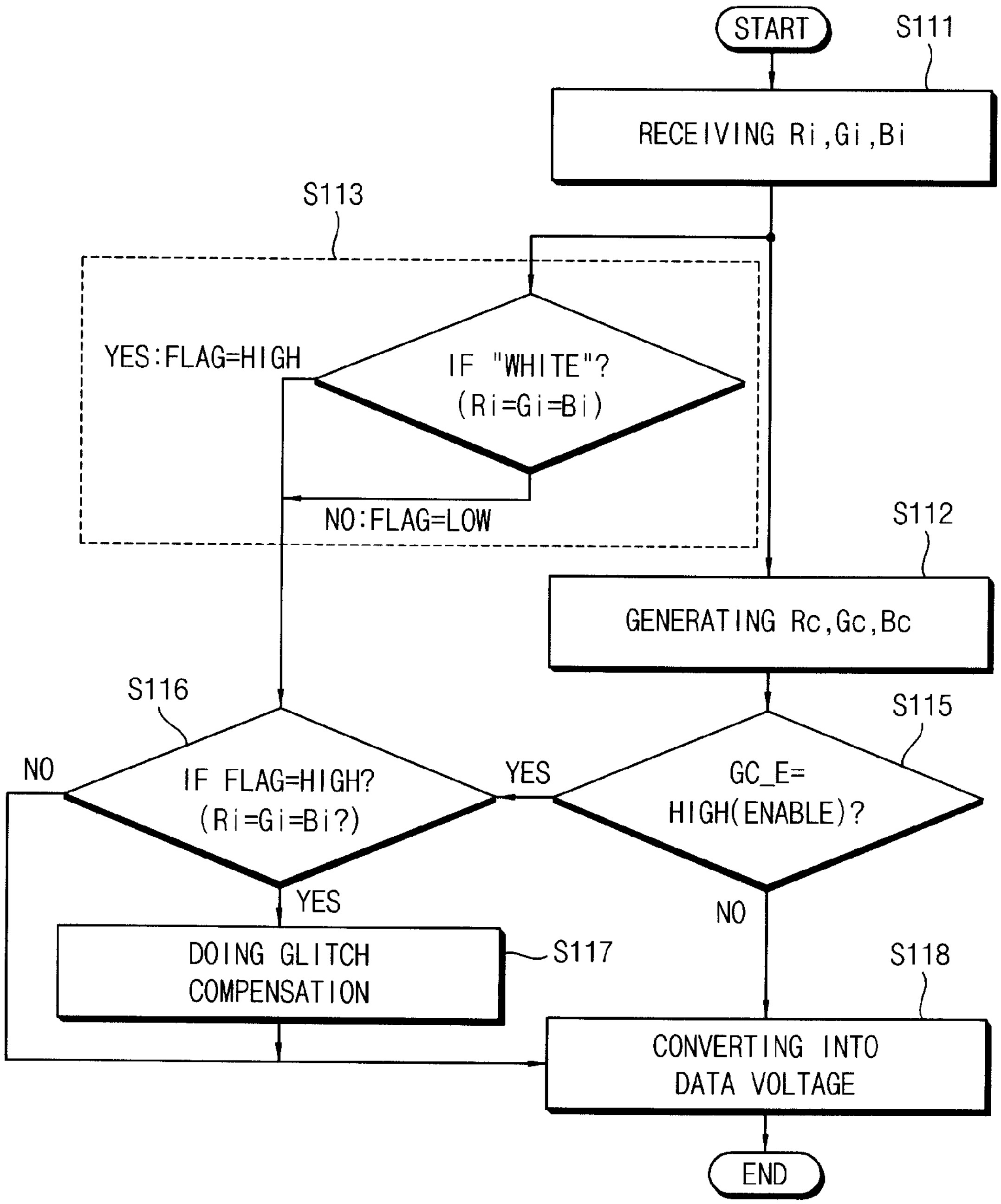
FIG. 4 is a flowchart illustrating an exemplary embodiment of a method of processing data with respect to the display apparatus of FIG. 2 according to the invention.

FIG. 4 is a flowchart illustrating an exemplary embodiment of a method of processing data with respect to the display apparatus of FIG. 2 according to the invention.

Referring to FIGS. 2 and 4, red, green and blue data Ri, Gi and Bi are received (step S111). The color correcting part 210 generates corrected color data Rc, Gc and Bc corresponding to color data Ri, Gi and Bi using the LUT and outputs the corrected color data Rc, Gc and Bc (step S112).

The glitch correcting part 230 determines whether the color data Ri, Gi and Bi received from the color correcting part 210 are the achromatic color data, for example, the white data (step S113). When the received color data is the white data that includes red, green and blue data Ri, Gi and Bi having the same grayscale value each other (Ri=Gi=Bi), a flag of a high level is applied to the received color data. When the received color data are the chromatic color data that includes red, green and blue data Ri, Gi and Bi having the grayscale value of at least one different from each other (Ri≠Gi≠Bi), a flag of a low level is applied to the received color data (step S113).

The glitch correcting part 230 may determine whether to correct the glitch of the corrected color data Rc, Gc and Bc provided from the color correcting part 210 based on an enable signal GC_E for a glitch correction provided from the control part 100.

When the enable signal GC_E for the glitch correction has a high level (step S115), the glitch correcting part 230 corrects the glitch of the corrected color data Rc, Gc and Bc. However, when the enable signal GC_E for the glitch correction has a low level (step S115), the glitch correcting part 230 passes the corrected color data Rc, Gc and Bc to the data driving part 300.

When the enable signal GC_E for the glitch correction has the high level and the flag has the high level (step S116), the glitch correcting part 230 applies the glitch correction value to the corrected color data Rc, Gc and Bc to generate the color glitch correction data Rc_GL, Gc_GL and Bc_GL (step S117).

The data driving part 300 converts the color glitch correction data Rc_GL, Gc_GL and Bc_GL into the color data voltages and outputs the color data voltages to the data line (step S118).

However, when the flag has the low level (step S116), the glitch correcting part 230 does not correct the glitch corresponding to the received red, green and blue data (Ri≠Gi≠Bi). In other words, when the received red, green and blue data Ri, Gi and Bi is the chromatic color data (Ri≠Gi≠Bi), the glitch correcting part 230 does not correct the corrected color data Rc, Gc and Bc corrected from the color correcting part 210 and outputs the corrected color data Rc, Gc and Bc to the data driving part 300. The data driving part 300 converts the corrected color data Rc, Gc and Bc into the color data voltages and outputs the color data voltages to the data line (step S118).

In one exemplary embodiment, for example, when the received red, green and blue data Ri, Gi and Bi are “0” of the grayscale value (Ri=Gi=Bi=0), a method of processing the received color data will be explained referring to FIG. 4.

The glitch correcting part 230 determines that the received color data Ri, Gi and Bi are the white data of 0-grayscale and applies the flag of the high level to the received color data Ri, Gi and Bi.

The color correcting part 210 generates the corrected color data Rc, Gc and Bc corresponding to the received color data (Ri=Gi=Bi=0) using the LUT. In one exemplary embodiment, for example, the color correcting part 210 corrects the red data (Ri=0) of the 0-grayscale into corrected red data (Rc=1) of 1-grayscale, the green data (Gi=0) of the 0-grayscale into corrected green data (Gc=3) of 3-grayscale and the blue data (Bi=0) of the 0-grayscale into corrected blue data (Bc=4) of 4-grayscale. The color correcting part 210 outputs the corrected color data Rc=1, Gc=3 and Bc=4.

The glitch correcting part 230 corrects the corrected red, green and blue data Rc, Gc and Bc using the glitch correction value in response to the enable signal GC_E for the glitch correction provided from the control part 100. In one exemplary embodiment, for example, when the white data is the 0-grayscale, a red glitch correction value is “+4”, a green glitch correction value is “0” and a blue glitch correction value is “+2”. The glitch correcting part 230 applies the red glitch correction value “+4” to the corrected red data (Rc=1) to generate red glitch correction data (Rc_GL=5), applies the green glitch correction value “0” to the corrected green data (Gc=3) to generate green glitch correction data (Gc_GL=3) and applies the blue glitch correction value “+2” to the corrected red data (Bc=4) to generate blue glitch correction data (Bc_GL=6).

The glitch correcting part 230 provides the red, green and blue glitch correction data Rc_GL, Gc_GL and Bc_GL to the data driving part 300. The data driving part 300 converts the red, green and blue glitch correction data Rc_GL, Gc_GL and Bc_GL of the digital type into the red, green and blue data voltages of the analogue type, and outputs the red, green and blue data voltages to the data line.

Hereinafter, the same reference numerals will be used to refer to the same or like parts as those described in the previous exemplary embodiment, and any repetitive detailed explanation will be simplified or omitted.

Figure 5:
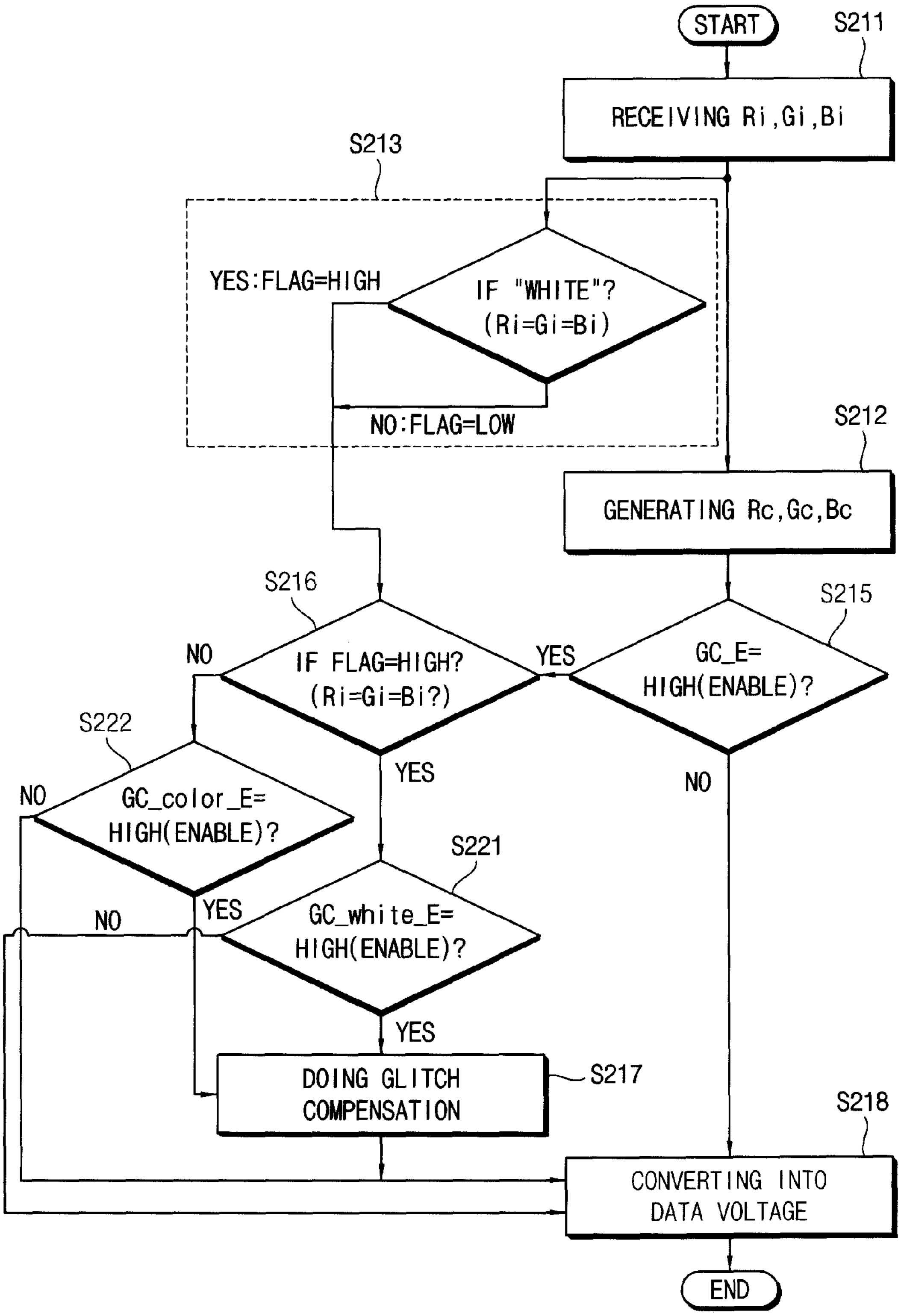
FIG. 5 is a flowchart illustrating another exemplary embodiment of a method of processing data according to the invention.

FIG. 5 is a flowchart illustrating another exemplary embodiment of a method of processing data according to the invention.

Referring to FIGS. 2 and 5, red, green and blue data Ri, Gi and Bi are received (step S211). The color correcting part 210 generates corrected color data Rc, Gc and Bc corresponding to the received color data Ri, Gi and Bi using the LUT (step S212).

The glitch correcting part 230 determines whether the received color data Ri, Gi and Bi provided from the color correcting part 210 are the achromatic color data, in other words, white data (step S213). When the received color data is the white data that includes red, green and blue data Ri, Gi and Bi having the same grayscale value (Ri=Gi=Bi), a flag of a high level is applied to the received color data Ri, Gi and Bi. When the received color data Ri, Gi and Bi are the chromatic color data that includes red, green and blue data having the grayscale value of at least one different from each other (Ri≠Gi≠Bi), the flag of a low level is applied to the received color data Ri, Gi and Bi (step S213).

The glitch correcting part 230 may determine whether to correct the glitch of the corrected color data Rc, Gc and Bc provided from the color correcting part 210 based on a control of the control part 100 (step S215).

When an enable signal GC_E for the glitch correction has a high level and the flag has the high level (step S216), the glitch correcting part 230 determines whether an enable signal GC_white_E for a white correction provided from the control part 100 has a high level (step S221). When the enable signal GC_white_E for the white correction has the high level, the glitch correcting part 230 applies the glitch correction value to the corrected color data Rc, Gc and Bc corresponding to the received white data Ri=Gi=Bi and generates color glitch correction data Rc_GL, Gc_GL and Bc_GL (step S217).

The data driving part 300 converts the color glitch correction data Rc_GL, Gc_GL and Bc_GL into the color data voltages and outputs the color data voltages to the data line (step S218).

When the enable signal GC_white_E for the white correction has a low level, the glitch correcting part 230 outputs the corrected color data Rc, Gc and Bc corresponding to the received white data (Ri=Gi=Bi) to the data driving part 300. The data driving part 300 converts the corrected color data Rc, Gc and Bc into the color data voltages and outputs the color data voltages to the data line (step S218).

When the enable signal GC_E for the glitch correction has the high level and the flag has the low level (step S216), the glitch correcting part 230 determines whether an enable signal GC_color_E for a color correction provided from the control part 100 has the high level (step S222). If the enable signal GC_color_E for the color correction has the high level, the glitch correcting part 230 applies the glitch correction value to the corrected color data Rc, Gc and Bc corresponding to the chromatic color data that includes the red, green and blue data having the grayscale value of at least one different from each other (Ri≠Gi≠Bi) and generates color glitch correction data Rc_GL, Gc_GL and Bc_GL (step S217). When the enable signal GC_color_E for the color correction has the low level, the glitch correcting part 230 outputs the corrected color data Rc, Gc and Bc corresponding to the chromatic color data (Ri≠Gi≠Bi) to the data driving part 300.

When the enable signal GC_E for the glitch correction has the low level (step S215), the glitch correcting part 230 outputs the corrected color data Rc, Gc and Bc to the data driving part 300. The data driving part 300 converts the corrected color data Rc, Gc and Bc into the color data voltages and outputs the color data voltages to the data line (step S218).

According to the exemplary embodiment, the glitch of the achromatic color data (Ri=Gi=Bi) and the chromatic color data (Ri≠Gi≠Bi) may be selectively corrected based on control signals of the enable signal GC_white_E for the white correction and the enable signal GC_color_E for the color correction, respectively that are provided from the control part 100.

Figure 6:
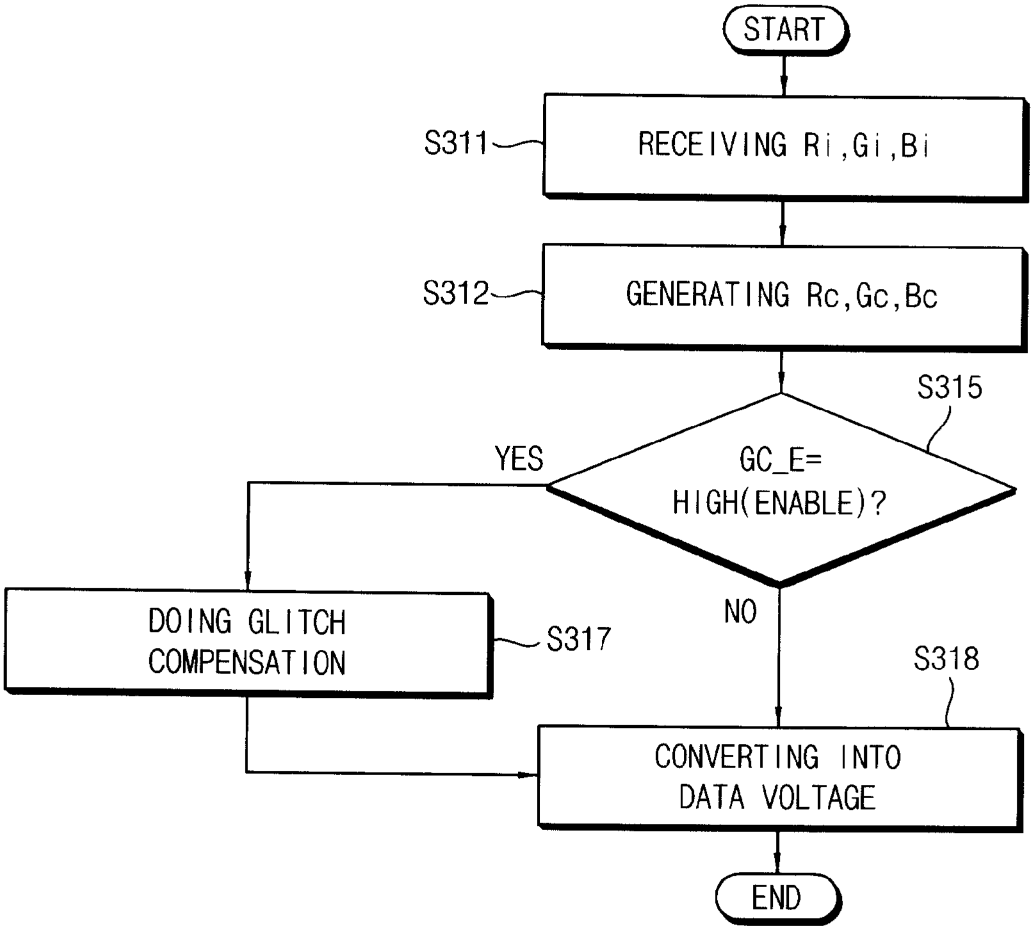
FIG. 6 is a flowchart illustrating another exemplary embodiment of a method of processing data according to the invention.

FIG. 6 is a flowchart illustrating another exemplary embodiment of a method of processing data according to the invention.

Referring to FIGS. 2 and 6, in the exemplary embodiment, a glitch of the chromatic color data as well as the achromatic color data may be corrected using a preset glitch correction value.

The red, green and blue data Ri, Gi and Bi are received (step S311).

The color correcting part 210 generates corrected color data Rc, Gc and Bc corresponding to the received color data Ri, Gi and Bi using the LUT (step S312).

The glitch correcting part 230 may determine whether to correct the glitch of the corrected color data Rc, Gc and Bc provided from the color correcting part 210 based on the enable signal GC_E for the glitch correction provided from the control part 100.

When the enable signal GC_E for the glitch correction has the high level (step S315), the glitch correcting part 230 applies the glitch correction value to the corrected color data Rc, Gc and Bc and generates the color glitch correction data Rc_GL, Gc_GL and Bc_GL. The glitch correcting part 230 provides the color glitch correction data Rc_GL, Gc_GL and Bc_GL to the data driving part 300 (step S317).

The data driving part 300 converts the color glitch correction data Rc_GL, Gc_GL and Bc_GL into the color data voltages and outputs the color data voltages to the data line (step S318).

When the enable signal GC_E for the glitch correction has the low level (step S315), the glitch correcting part 230 does not correct the glitch of the corrected color data Rc, Gc and Bc and outputs the corrected color data Rc, Gc and Bc to the data driving part 300 (step S317). The data driving part 300 converts the corrected color data Rc, Gc and Bc into the color data voltages and outputs the color data voltages to the data line (step S318).

According to the exemplary embodiment, the glitch correcting part 230 may select whether to correct the glitch of the corrected color data based on the enable signal GC_E for the glitch correction provided from the control part 100. In other words, the glitch correcting part 230 may determines whether to correct the glitch of all received color data. In the illustrated embodiment, for example, when the enable signal GC_E for the glitch correction has the high level, the glitch correction value is applied the corrected color data corresponding to the received color data to generate the color glitch correction data. When the enable signal GC_E for the glitch correction has the low level, the glitch of the corrected color data corresponding to the received color data is not corrected.

According to the invention, the color data is corrected using the glitch correction value preset corresponding to a transition of the data voltage so that a falling off in a display quality by non-uniform color, etc. may be reduced or effectively prevented.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific example embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A method of processing data, the method comprising:

correcting received color data and generating corrected color data using a processor;

generating color glitch correction data corresponding to the corrected color data using a glitch correction value preset based on the received color data using the processor; and converting the color glitch correction data into a color data voltage, using the processor, and providing the color data voltage to a display panel.

2. The method of claim 1, wherein
the color data voltage includes a red data voltage, a green data voltage and a blue data voltage, and
the red, green and blue data voltages are applied to a same data line in the display panel.

3. The method of claim 2, wherein the generating the color glitch correction data comprises:
determining whether the received color data is an achromatic color or a chromatic color; and
generating achromatic color glitch correction data corresponding to achromatic corrected color data using the glitch correction value, when the received color data is the achromatic color.

4. The method of claim 3, wherein the converting the color glitch correction data comprises:
converting the achromatic corrected color data into the color data voltage and providing the color data voltage to the data line, when the received color data is the chromatic color.

5. The method of claim 2, wherein the generating the color glitch correction data comprises:
determining whether the received color data is an achromatic color or a chromatic color;
generating achromatic color glitch correction data corresponding to achromatic corrected color data using the glitch correction value for an achromatic color, when the received color data is the achromatic color; and
generating chromatic color glitch correction data corresponding to chromatic corrected color data using the glitch correction value for a chromatic color, when the received color data is the chromatic color.

6. A display apparatus comprising:
a display panel including a plurality of color pixels;
a color correcting part which generates corrected color data corresponding to received color data using a look-up table which stores the corrected color data;
a glitch correcting part which generates color glitch correction data corresponding to the corrected color data using a glitch correction value preset based on the received color data; and
a data driving part which converts the corrected color data and the color glitch correction data into a color data voltage, and provides the color data voltage to the display panel.

7. The display apparatus of claim 6, wherein
the display panel includes a plurality of data lines and a plurality of gate lines, and
each of the data lines is in connection with color pixels which are different from each other.

8. The display apparatus of claim 7, wherein each of the data lines is in connection with red, green and blue pixels.

9. The display apparatus of claim 7, wherein
the color data voltage includes red, green and blue data voltages, and
the data driving part provides the red, green and blue data voltages to a same data line.

10. The display apparatus of claim 7, further comprising:
a control part which controls an operation of the glitch correcting part.

11. The display apparatus of claim 10, wherein
the glitch correcting part determines whether the received color data is an achromatic color or a chromatic color, and
the control part controls the glitch correcting part to apply the glitch correction value to achromatic corrected color data generated from the color correcting part and to generate achromatic color glitch correction data, when the received color data is the achromatic color.

12. The display apparatus of claim 10, wherein the control part controls the glitch correcting part to provide chromatic corrected color data generated from the color correcting part to the data driving part, when the received color data is the chromatic color.

13. The display apparatus of claim 10, wherein
the glitch correcting part determines whether the received color data is an achromatic color or a chromatic color,
the glitch correcting part applies the glitch correction value for an achromatic color to achromatic corrected color data and generates achromatic color glitch correction data, when the received color data is the achromatic color, and
the glitch correcting part applies the glitch correction value for a chromatic color to chromatic corrected color data and generates chromatic color glitch correction data, when the received color data is the chromatic color.

14. A method of processing data, the method comprising:
generating red, green and blue corrected data to be uniform a white level corresponding to received red, green and blue data using a processor;
correcting the red, green and blue corrected data using a glitch correction value preset based on the received red, green and blue data, and generating red, green and blue glitch correction data using the processor; and
converting the red, green and blue glitch correction data into red, green and blue data voltages and outputting the red, green and blue data voltages to a data line of a display panel, by a time-division mode using the processor,
wherein the red, green and blue glitch correction data corrects a glitch generated by transition of the red, green and blue data voltages applied to the data line.

15. The method of claim 14, wherein when the received red, green and blue data are the same, the red, green and blue glitch correction data are generated using the glitch correction value for an achromatic color.

16. The method of claim 14, wherein when at least one of the received red, green and blue data are different from each other,
the red, green and blue corrected data are converted into the red, green and blue data voltages and the red, green and blue data voltages are outputted to the data line by the time-division mode.

17. The method of claim 15, wherein when at least one of the received red, green and blue data are different from each other,
the red, green and blue glitch correction data are generated using the glitch correction value for an chromatic color.

18. The method of claim 17, further comprising generating an enable signal for the glitch correction using the processor,
wherein the red, green and blue glitch correction data are generated based on the enable signal for the glitch correction.

19. The method of claim 17, further comprising generating an enable signal for a white correction using the processor,
wherein the red, green and blue glitch correction data are generated using the glitch correction value for the achromatic color in response to the enable signal for the white correction.

20. The method of claim 19, further comprising generating an enable signal for a color correction using the processor, wherein the red, green and blue glitch correction data are generated using the glitch correction value for the chromatic color in response to the enable signal for the color correction.

* * * * *